United States Patent
Hashimoto

(10) Patent No.: US 10,168,888 B2
(45) Date of Patent: Jan. 1, 2019

(54) INFORMATION PROCESSING DEVICE AND TOUCH OPERATION DETECTION METHOD

(71) Applicant: Sony Corporation, Tokyo (JP)

(72) Inventor: Hirokazu Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/938,932

(22) Filed: Jul. 10, 2013

(65) Prior Publication Data

US 2013/0300698 A1   Nov. 14, 2013

Related U.S. Application Data

(63) Continuation of application No. 12/326,991, filed on Dec. 3, 2008.

(30) Foreign Application Priority Data

Dec. 21, 2007   (JP) .................................. 2007-330849

(51) Int. Cl.
*G06F 3/0488*   (2013.01)

(52) U.S. Cl.
CPC ........ *G06F 3/0488* (2013.01); *G06F 3/04883* (2013.01)

(58) Field of Classification Search
CPC ............. G06F 3/0488; G06F 2203/013; G06F 2203/014; G06F 2203/015; G06F 3/011;
(Continued)

(56) References Cited

U.S. PATENT DOCUMENTS 4,761,742 A * 8/1988 Hanabusa .......... G01C 21/3679
340/988
5,608,635 A * 3/1997 Tamai ................ G01C 21/3461
340/990
(Continued)

FOREIGN PATENT DOCUMENTS

JP   3-269717   12/1991
JP   8-137609    5/1996
(Continued)

OTHER PUBLICATIONS

Office Action dated Aug. 16, 2011 in Japanese Patent Application No. 2007-330849.
(Continued)

*Primary Examiner* — Grant Sitta
(74) *Attorney, Agent, or Firm* — Xsensus LLP

(57) ABSTRACT

An information processing device includes: a display unit having a touch panel on its front surface; a movement amount calculation unit that calculates the movement amount of a touch operation based on a touch point at which the touch operation is performed with respect to the touch panel and a touch release point at which the touch operation is released from the touch panel; an operation determination unit that determines whether the touch operation is a depression operation or a gesture operation depending on the calculated movement amount; and a command recognition unit that recognizes whether a received command is a command corresponding to the depression operation or the gesture operation.

23 Claims, 12 Drawing Sheets

(58) Field of Classification Search
CPC .......... G06F 3/012; G06F 3/013; G06F 3/014; G06F 3/016; G06F 3/0416; G06F 3/0418; G06F 1/1662; G06F 3/0202; G06F 1/1666; G06F 3/04883; H01H 13/83; H04M 1/22; H04M 345/17
USPC .................. 345/156–173; 715/600; 701/208
See application file for complete search history.

(56) References Cited

U.S. PATENT DOCUMENTS

| | | | | |
|---|---|---|---|---|
| 5,848,373 | A * | 12/1998 | DeLorme | G01C 21/20 701/455 |
| 5,908,465 | A * | 6/1999 | Ito | G01C 21/3614 340/995.27 |
| 5,938,720 | A * | 8/1999 | Tamai | G01C 21/3446 701/411 |
| 6,057,845 | A * | 5/2000 | Dupouy | G06F 3/0481 382/186 |
| 6,094,197 | A | 7/2000 | Buxton et al. | |
| 6,321,158 | B1 * | 11/2001 | DeLorme | G01C 21/26 340/995.16 |
| 6,405,129 | B1 * | 6/2002 | Yokota | G01C 21/3682 340/995.24 |
| 6,434,482 | B1 * | 8/2002 | Oshida | G01C 21/3679 340/995.24 |
| 6,542,817 | B2 * | 4/2003 | Miyaki | G01C 21/3679 340/995.19 |
| 6,571,169 | B2 * | 5/2003 | Miyaki | G01C 21/36 340/995.1 |
| 6,640,185 | B2 * | 10/2003 | Yokota et al. | 701/455 |
| 6,856,901 | B2 * | 2/2005 | Han | G01C 21/3682 340/995.17 |
| 7,044,372 | B2 * | 5/2006 | Okuda | G01C 21/20 235/375 |
| 7,458,037 | B2 * | 11/2008 | Fuchs | G01C 21/36 715/781 |
| 7,496,484 | B2 * | 2/2009 | Agrawala | G01C 21/367 340/988 |
| 7,916,852 | B2 * | 3/2011 | Bruce | G01C 21/26 379/218.02 |
| 7,990,394 | B2 * | 8/2011 | Vincent | G06T 17/05 345/419 |
| 8,397,171 | B2 * | 3/2013 | Klassen | G01C 21/3682 345/157 |
| 8,428,874 | B2 * | 4/2013 | Park | G01C 21/3611 701/410 |
| 2001/0055373 | A1 * | 12/2001 | Yamashita | H04N 5/232 379/90.01 |
| 2003/0060937 | A1 * | 3/2003 | Shinada | G01C 21/3641 701/1 |
| 2003/0206199 | A1 | 11/2003 | Pusa et al. | |
| 2004/0070602 | A1 * | 4/2004 | Kobuya | G01C 21/36 715/738 |
| 2004/0193371 | A1 * | 9/2004 | Koshiji | G01C 21/3688 701/455 |
| 2004/0201501 | A1 * | 10/2004 | Daizen | G01C 21/34 340/995.16 |
| 2005/0248542 | A1 | 11/2005 | Sawanobori | |
| 2005/0267676 | A1 * | 12/2005 | Nezu et al. | 701/200 |
| 2006/0200309 | A1 * | 9/2006 | Yu | G01C 21/32 701/532 |
| 2006/0265422 | A1 * | 11/2006 | Ando | G01C 21/3679 |
| 2007/0176609 | A1 | 8/2007 | Ely et al. | |
| 2008/0082930 | A1 * | 4/2008 | Omernick et al. | 715/765 |
| 2008/0201650 | A1 * | 8/2008 | Lemay et al. | 715/763 |
| 2009/0037092 | A1 * | 2/2009 | Lathrop | G08G 1/0962 701/533 |
| 2009/0102806 | A1 * | 4/2009 | Tomkins | 345/173 |

FOREIGN PATENT DOCUMENTS

| | | |
|---|---|---|
| JP | 10-269021 | 10/1998 |
| JP | 11-259206 | 9/1999 |
| JP | 11-305933 | 11/1999 |
| JP | 2000-504869 | 4/2000 |
| JP | 2000-137564 | 5/2000 |
| JP | 2002-189567 | 7/2002 |
| JP | 2003-140820 | 5/2003 |
| JP | 2003-263144 | 9/2003 |
| JP | 2004-348755 | 12/2004 |
| JP | 2006-85703 | 3/2006 |
| JP | 2006-215915 | 8/2006 |
| JP | 2007-18095 | 1/2007 |
| JP | 2008-542760 | 11/2008 |
| WO | WO 2006/132960 A1 | 12/2006 |

OTHER PUBLICATIONS

Office Action dated Jul. 31, 2012 in Japanese Patent Application No. 2007-330849, 2 pages.

Office Action dated Jan. 17, 2012 in Japanese Patent Application No. 2007-330849.

* cited by examiner

INFORMATION PROCESSING DEVICE AND TOUCH OPERATION DETECTION METHOD

CROSS REFERENCES TO RELATED APPLICATIONS

This application is a continuation of and is based upon and claims the benefit of priority under 35 U.S.C. § 120 to U.S. Ser. No. 12/326,991, filed Dec. 3, 2008 and claims the benefit of priority under 35 U.S.C. § 119 to Japanese Patent Application No. JP2007-330849, filed Dec. 21, 2007, the entire contents of which of each are incorporated herein by reference.

BACKGROUND OF THE INVENTION

Field of the Invention

The present invention relates to an information processing device and a touch operation detection method, which are suitably applied to, e.g., a portable navigation device.

Description of the Related Art

A portable navigation device (hereinafter, referred to as "PND") is designed to be detachably attached to the dashboard of a vehicle via a cradle.

The PND of such a type serves as a vehicle navigation device when being attached to the dashboard via a cradle and serves as a personal navigation device when being detached from the dashboard.

This type of PND aims more for portability than remote-controllability. Thus, a remote controller is not provided for the PND but a user interface that receives a command from a user via a touch panel provided on the front surface of a liquid crystal display is adopted.

There is also known an electric book display control device equipped with a display integrated tablet on which a user uses his or her finger to perform a pointing operation to realize a page-turning operation (refer to, e.g., Jpn. Pat. Appln. Laid-Open Publication No. 2004-348755).

SUMMARY OF THE INVENTION

The PND having such a configuration displays a plurality of destination candidates so as to allow a user to select his or her destination. If the destination candidates exist over a plurality of pages, the user needs to perform a page-turning operation in order to determine the destination.

In such a case, where the PND performs a page-turning operation in response to the user's pointing operation using his or her finger in the same manner as in the case of the abovementioned electric book display control device, the PND often erroneously detects that a depression operation with respect to the candidate destination has been made at the moment when the user falsely touched one of the destination candidates with his or her finger, not a page-turning button. Thus, there is a possibility that the PND cannot correctly reflect the user's intention to perform a pointing operation.

The present invention has been made in view of the above points and an object thereof is to propose an information processing device and a touch operation detection method capable of correctly detect a command issued in response to a user's touch operation.

To solve the above problem, according to an aspect of the present invention, there is provided an information processing device including: a display unit having a touch panel on its front surface; a movement amount calculation unit for calculating a movement amount of a touch operation based on a touch point at which the touch operation is performed with respect to the touch panel and a touch release point at which the touch operation is released from the touch panel; an operation determination unit for determining whether the touch operation is a depression operation or a gesture operation depending on the calculated movement amount; and a command recognition unit for recognizing whether a received command is a command corresponding to the depression operation or the gesture operation.

With the above configuration, the information processing device determines whether a touch operation is a button touch operation or a gesture operation depending on the movement amount of the touch operation, thereby correctly recognizing whether a received command is a command corresponding to the depression operation or the gesture operation.

According to another aspect of the present invention, there is provided a touch operation detection method including: a touch point detection step in which a touch point detection unit detects a touch point at which a touch operation is performed with respect to a touch panel provided on the front surface of a display unit; a touch release point detection step following the touch point detection step, in which a touch release point detection unit detects a touch release point at which the touch operation is released from the touch panel; a movement amount calculation step in which a movement amount calculation unit calculates a movement amount of the touch operation based on the touch point and touch release point; an operation determination step in which an operation determination unit determines whether the touch operation is a depression operation or a gesture operation depending on the calculated movement amount; and a command recognition step in which a command recognition unit recognizes whether a received command is a command corresponding to the depression operation or the gesture operation.

With the above configuration, the touch operation detection method determines whether a touch operation is a button touch operation or a gesture operation depending on the movement amount of the touch operation, thereby correctly recognizing whether a received command is a command corresponding to the depression operation or the gesture operation.

According to the present invention, whether a touch operation is a button touch operation or a gesture operation is determined depending on the movement amount of the touch operation, allowing correct determination on whether a received command is a command corresponding to the depression operation or the gesture operation. Therefore, an information processing device and a touch operation detection method capable of correctly recognizing a command corresponding to a user's touch operation can be realized.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

An embodiment of the present invention will be described in detail below with reference to the accompanying drawings.

(1) Outer Appearance of PND

Figure 1:
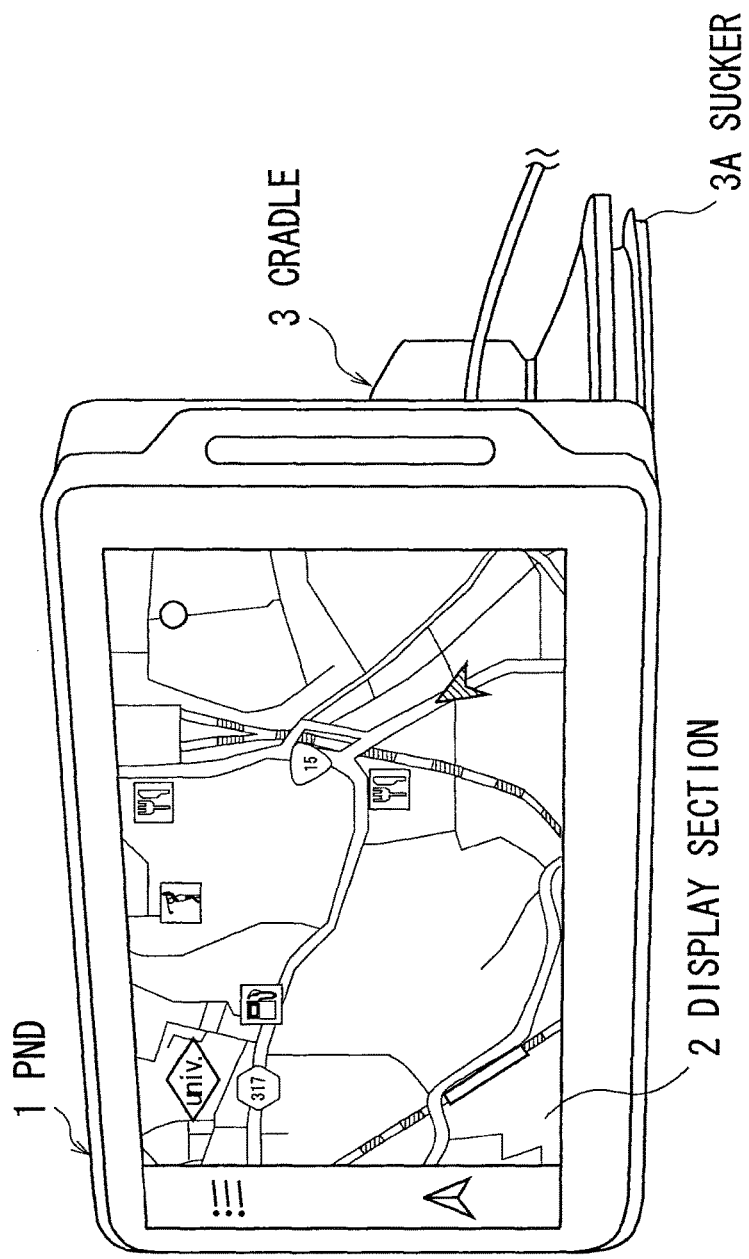
FIG. 1 is a perspective view schematically showing the outer appearance of a PND.

In FIG. 1, a reference numeral 1 denotes a portable navigation device (hereinafter, referred to as "PND") according to the embodiment of the present invention. The PND 1 has a display section 2 on which a 4.8 liquid crystal display is mounted and uses the display section 2 to present information such as a map, a current position icon PST, and a driving route toward a destination.

The PND 1 is held by a cradle 3 attached to a dashboard of a vehicle by a sucker 3A and is electrically connected thereto. In this state, the PND operates by a power supplied from a battery of the vehicle via the cradle 3. Further, when removed from the cradle 3, the PND 1 can operate by a power supplied from a battery incorporated therein.

(2) Circuit Configuration of PND

Figure 2:
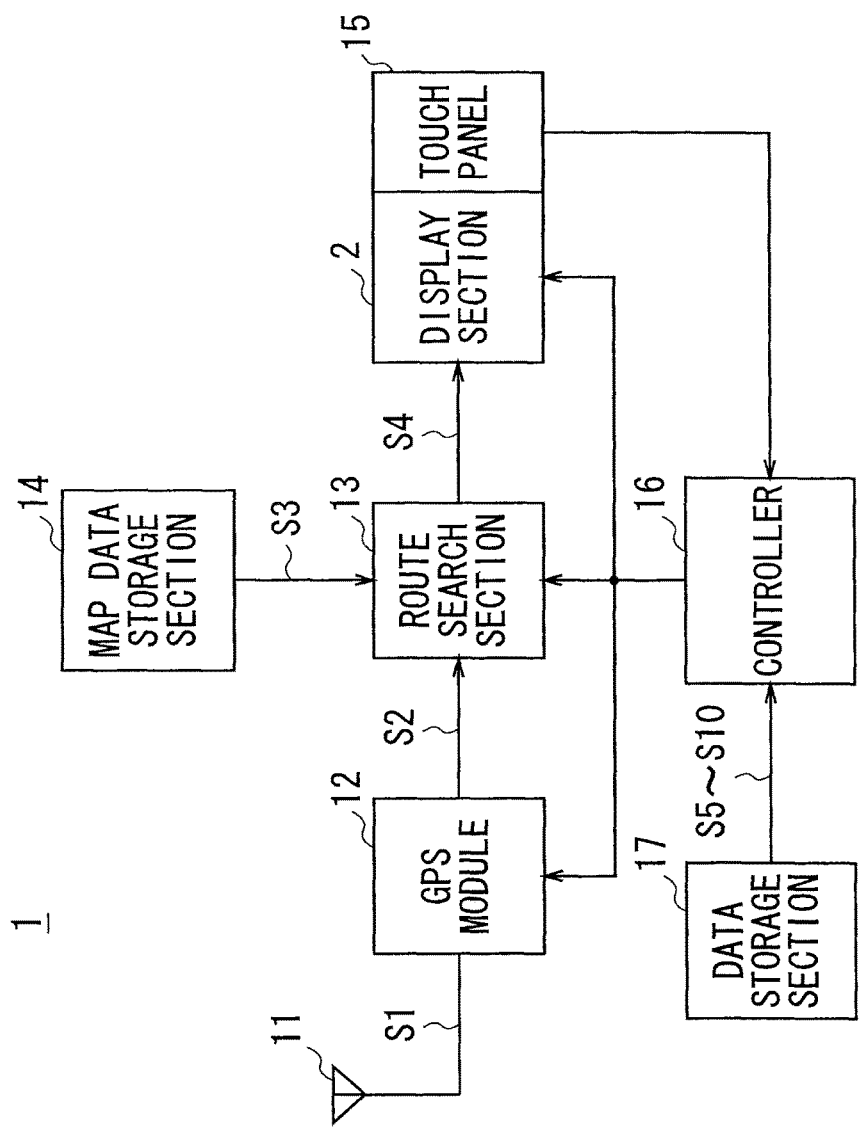
FIG. 2 is a block diagram schematically showing a circuit configuration of the PND.

As shown in FIG. 2, a controller 16 having a microcomputer configuration controls the entire operation of the PND 1 according a basic program and executes various navigation processing, command recognition processing to be described later, and the like according to various application programs stores in a hard disk, etc.

Concretely, the PND 1 uses a GPS module 12 to demodulate satellite signals S1 from a plurality of GPS satellites received via a GPS antenna 11 and, based on orbital data obtained as a result of the demodulation and distance data between the GPS satellites and vehicle, measures the current position of the vehicle with accuracy and transmits the obtained current position data (current position data S2) to a route search section 13.

The orbital data is detailed orbital information (parameter) representing a detailed orbit of each of the GPS satellites. In order to measure the current position of the vehicle with accuracy, the orbital data needs to be acquired from at least three GPS satellites.

The route search section 13 reads out map data S3 representing the current position of the vehicle and its surrounding area from a map data storage section 14 based on the current position data S2, searches the map data S3 for a driving route from the current position to a destination which has been set by a user, generates a route guide map S4 including the driving route, and transmits the route guide map S4 to the display section 2 constituted by a liquid crystal display.

Figure 3:
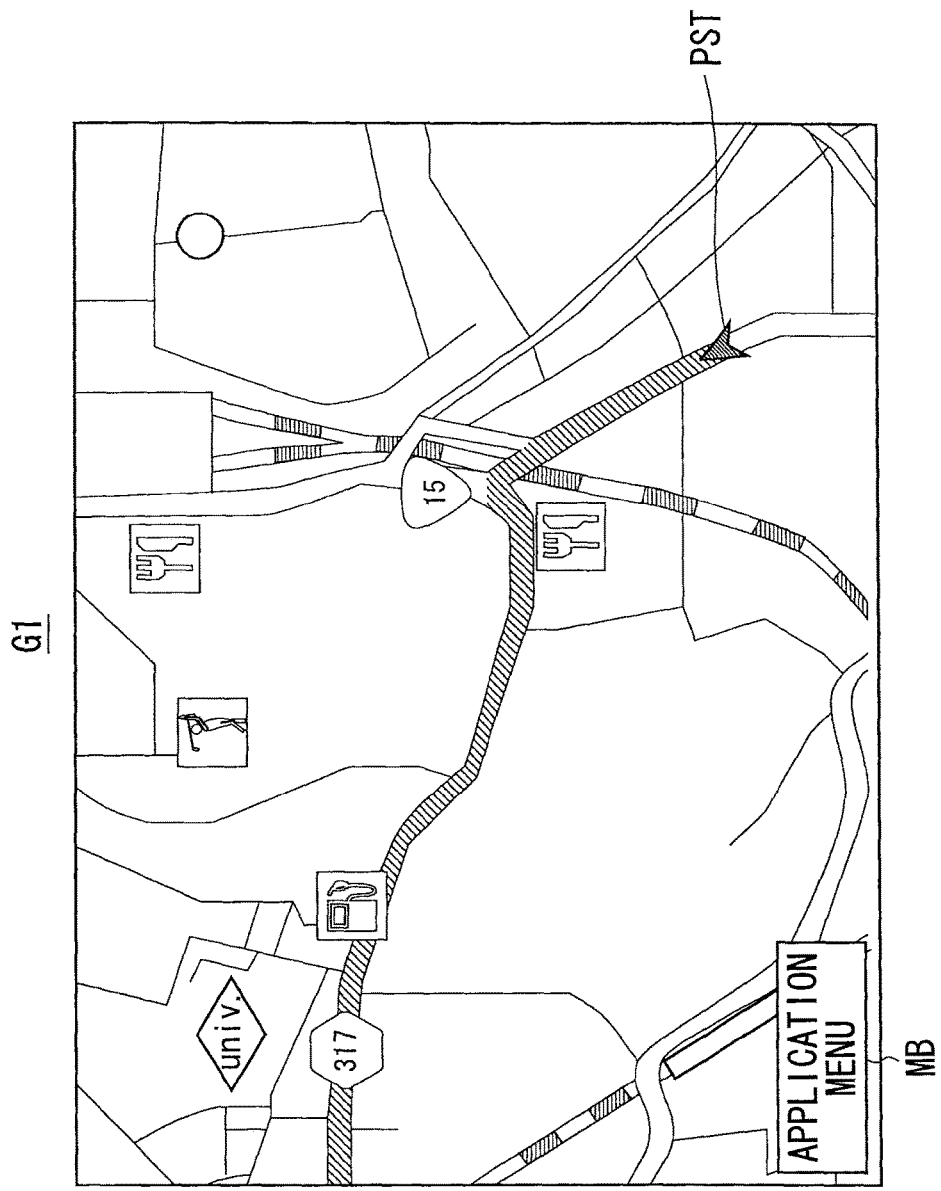
FIG. 3 is a view schematically showing a guide map image.

As shown in FIG. 3, the display section 2 displays a guide map image G1 corresponding to the route guide map data S4 and thereby allows a user to visually confirm the driving route from a current position icon PST to a destination (not shown).

When the controller 16 of the PND 1 receives a command S7 which has been issued in response to depression of an application menu button MB displayed in the lower left of the guide map image G1 via a touch panel 15, the controller 16 reads out application menu screen data S5 from a data storage section 17.

Figure 4:
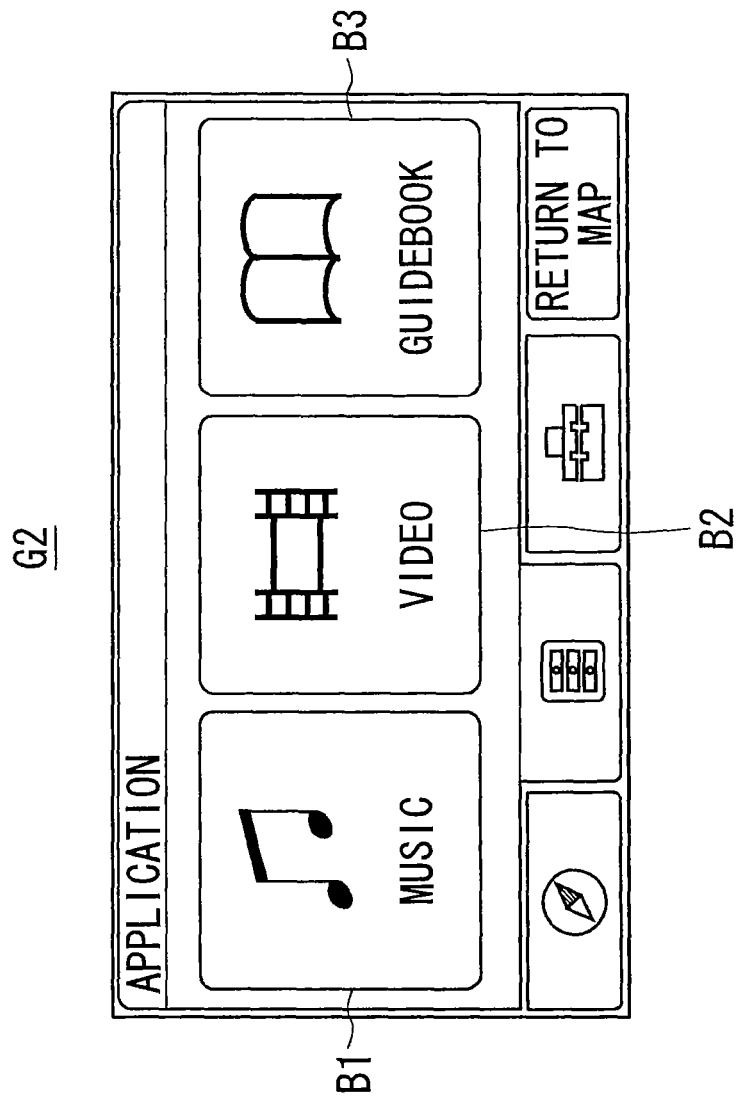
FIG. 4 is a view schematically showing an application menu screen.

The controller 16 of the PND 1 then displays an application menu screen G2 corresponding to the application menu screen data S5 on the display section 2 as shown in FIG. 4. In the application menu screen G2, a music button B1 for reproduction of music, a video button B2 for reproduction of video, and a guidebook button B3 for display of Point Of Interest (POI) which can be candidates of a destination or a stop-off point are displayed as choices to be selected through a user's touch operation.

When detecting a touch operation made to the guidebook button B3 in the application menu screen G2 via the touch panel 15 (FIG. 2), the controller 16 of the PND 1 reads out a book selection screen data S6 associated with the guidebook button B3 from the data storage section 17.

Figure 5:
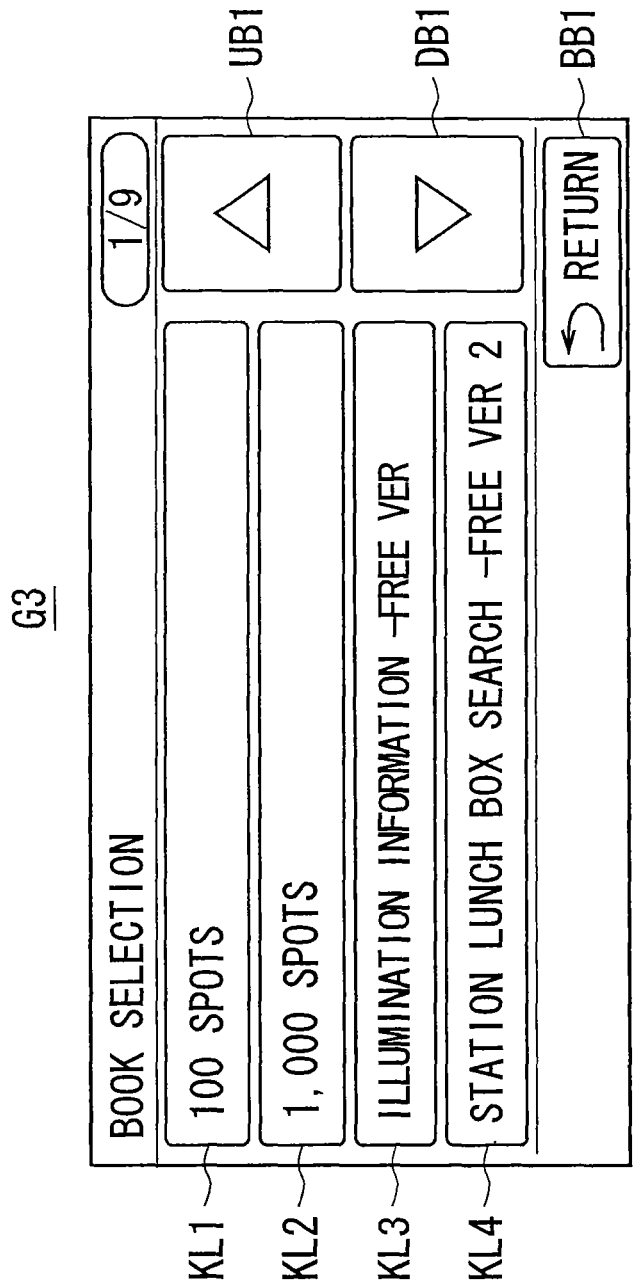
FIG. 5 is a view schematically showing a book selection screen.

The controller 16 of the PND 1 then displays a book selection screen G3 corresponding to the book selection screen data S6 on the display section 2 as shown in FIG. 5. The book selection screen G3 displays a list of choices of guidebooks such as "100 spots" item KL1, "1,000 spots" item KL2, "illumination information—free version" item KL3, "Ekiben (train lunch) search—free version 2)" item KL4, and an UP button UB1 and a down button DB1 for scrolling the list in the up-down direction.

The book selection screen G3 further displays a "return" button BB1. When the "return" button BB1 is touched by a user, the controller 16 of the PND 1 sets back the display content of the display section 2 from the book selection screen G3 to application menu screen G2.

When detecting, via the touch panel 15, that the "1,000 spots" item KL2 on the book selection screen G3 has been touched by a user, the controller 16 of the PND 1 reads out password requesting screen data S7 from the data storage section 17 if a password has been set for the "1,000 spots" item KL2.

Figure 6:
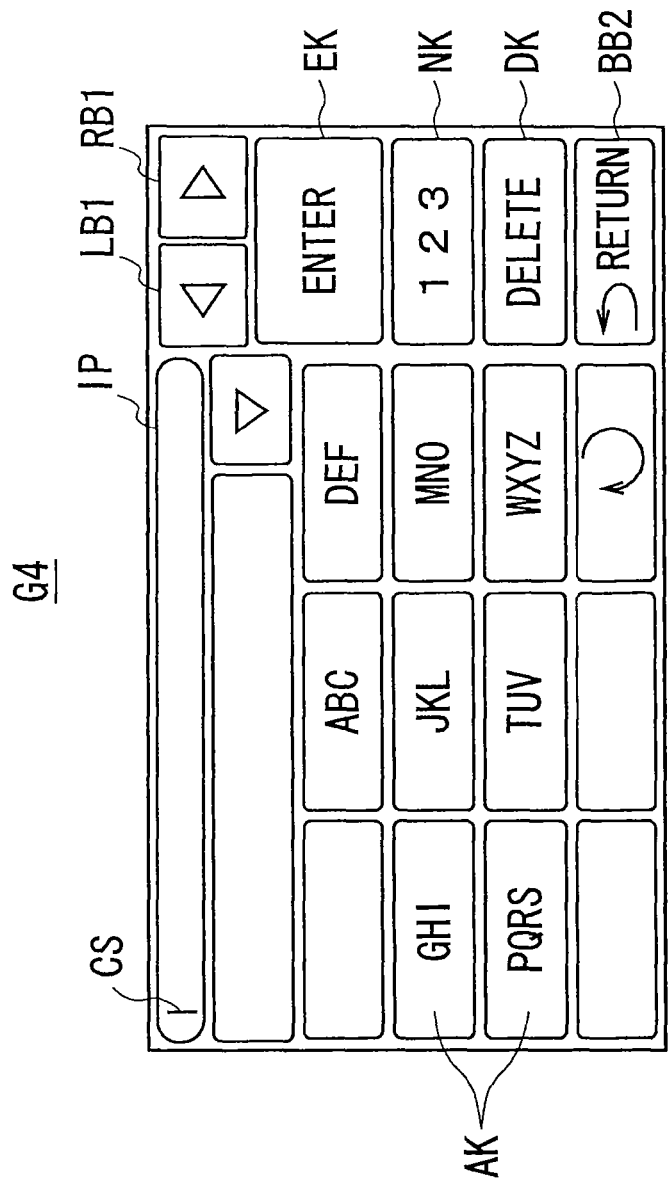
FIG. 6 is a view schematically showing a password requesting screen.

Then, as shown in FIG. 6, the controller 16 of the PND 1 displays a password requesting screen G4 corresponding to the password requesting screen data S7 on the display section 2. The password requesting screen G4 displays a password input field IP, alphabet keys AK, a numeric key NK, a delete key DK, an entry key EK, as well as, a left button LB1 and a right button RB2 for moving a cursor CS of the password input field IP in the left-right direction and a "return" button BB2.

Also in this case, when the "return" button BB2 is touched by a user, the controller 16 of the PND 1 sets back the display content of the display section 2 from the password requesting screen G4 to book selection screen G3.

The controller 16 of the PND 1 displays a password input in response to a touch operation with respect to the alphabet key AK or numeric key EK in the password input field IP of the password requesting screen G4 and determines the password displayed in the password input field IP in response to a touch operation with respect to the enter key EK.

When authentication based on the password input to the password input field IP of the password requesting screen G4 is successful, the controller 16 of the PND 1 reads out spot selection screen data S8 from the data storage section 17.

Figure 7:
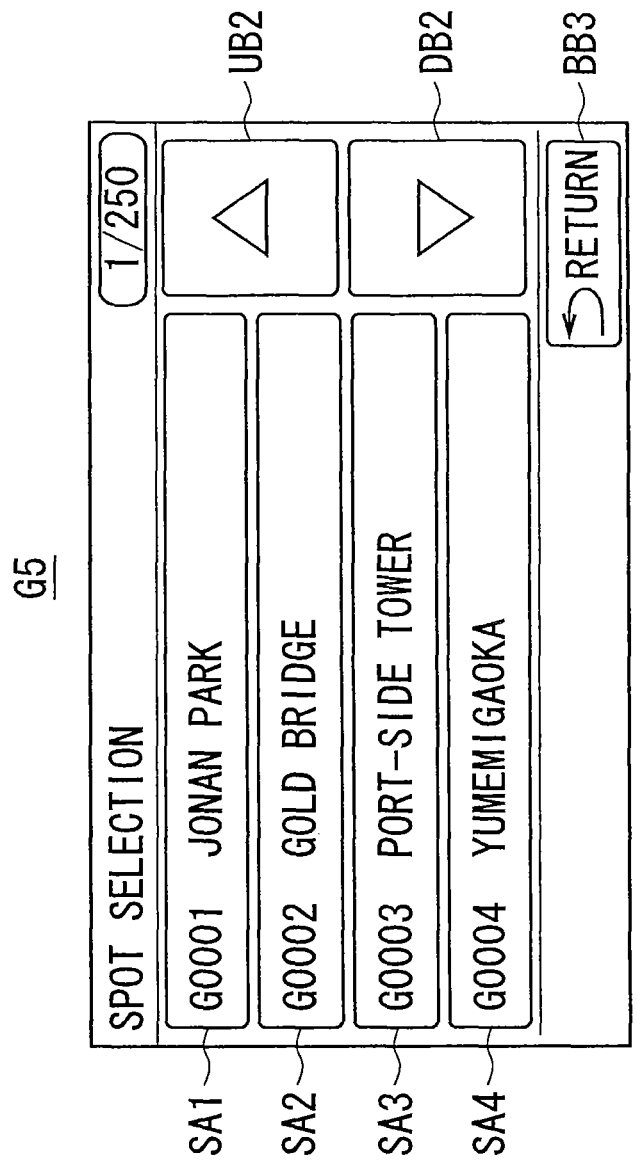
FIG. 7 is a view schematically showing a spot selection screen.

The controller 16 of the PND 1 then displays a spot selection screen G5 corresponding to the spot selection screen data S8 as shown in FIG. 7. The spot selection screen G5 displays, as the POIs which can be candidates of a destination or a stop-off point, a list of spot items SA1 to SA4: "G0001 Jonan Park", "G0002 Gold Bridge", "G0003 Port-side Tower", and "G0004 Yumemigaoka" and a up button UB2 and a down button DB2 for scrolling the list in the up-down direction.

Further, the spot selection screen G5 displays a "return" button BB3. When the "return" button BB3 is touched by a user, the controller 16 of the PND 1 sets back the display content of the display section 2 from the spot selection screen G5 to book selection screen G3.

When the controller 16 of the PND 1 detects via the touch panel 15 that e.g., the spot item SA1: "G0001 Jonan Park" displayed on the spot selection screen G5 has been touched, the controller 16 of the PND 1 reads out introduction page screen data S8 about "G0001 Jonan Park" from the data storage section 17.

Figure 8:
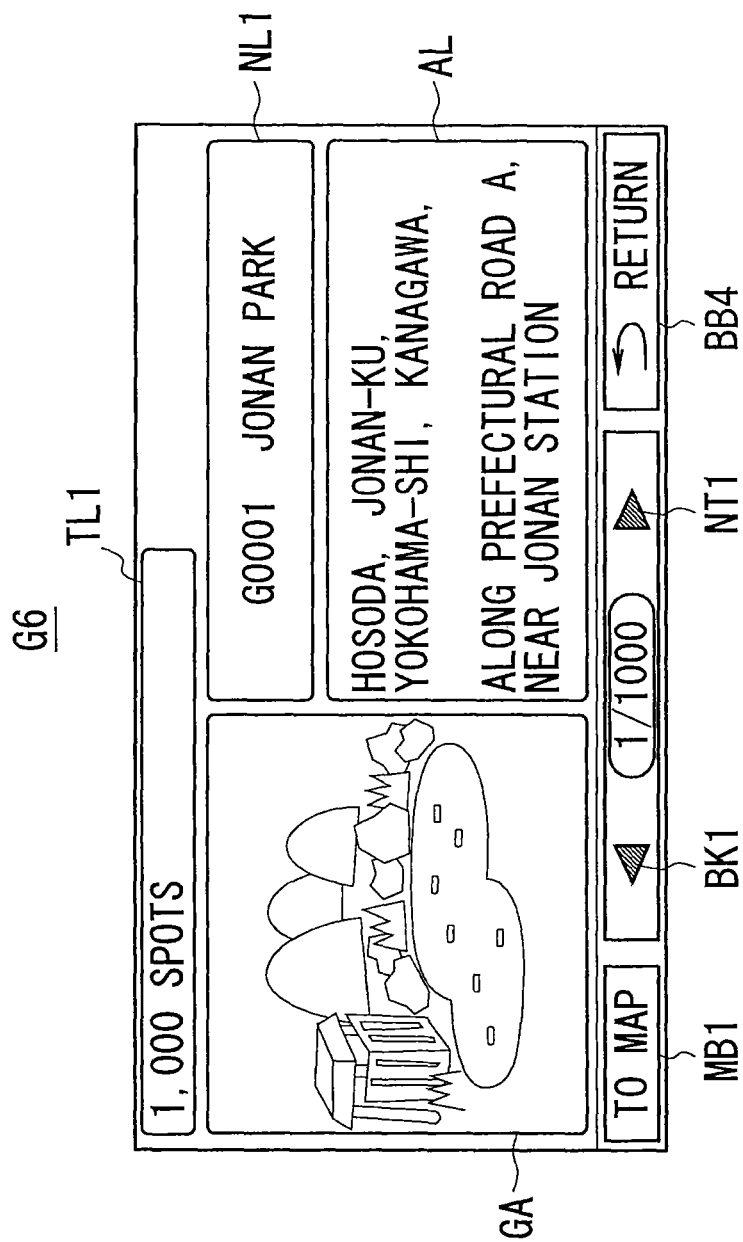
FIG. 8 is a view schematically showing an introduction page screen.

The controller 16 of the PND 1 then displays an introduction page screen G6 corresponding to the introduction page screen data S8 on the display section 2 as shown in FIG. 8. The introduction page screen G6 displays a guidebook name display field TL1, a photo display field GA, a spot item name display field NL1, a location specifying information display field AL, a "to-map" button MB1 for returning to the abovementioned guide map image G1 (FIG. 3), and a return button BB4.

The introduction page screen G6 further displays, in the lower center thereof, a next button NT1 with an arrow for displaying a next page and a back button BK1 with an arrow for displaying a previous page. When the next button NT1 is touched by a user, the controller 16 of the PND 1 reads out detailed page screen data S9 concerning the "Jonan Park" from the data storage section 17.

Figure 9:
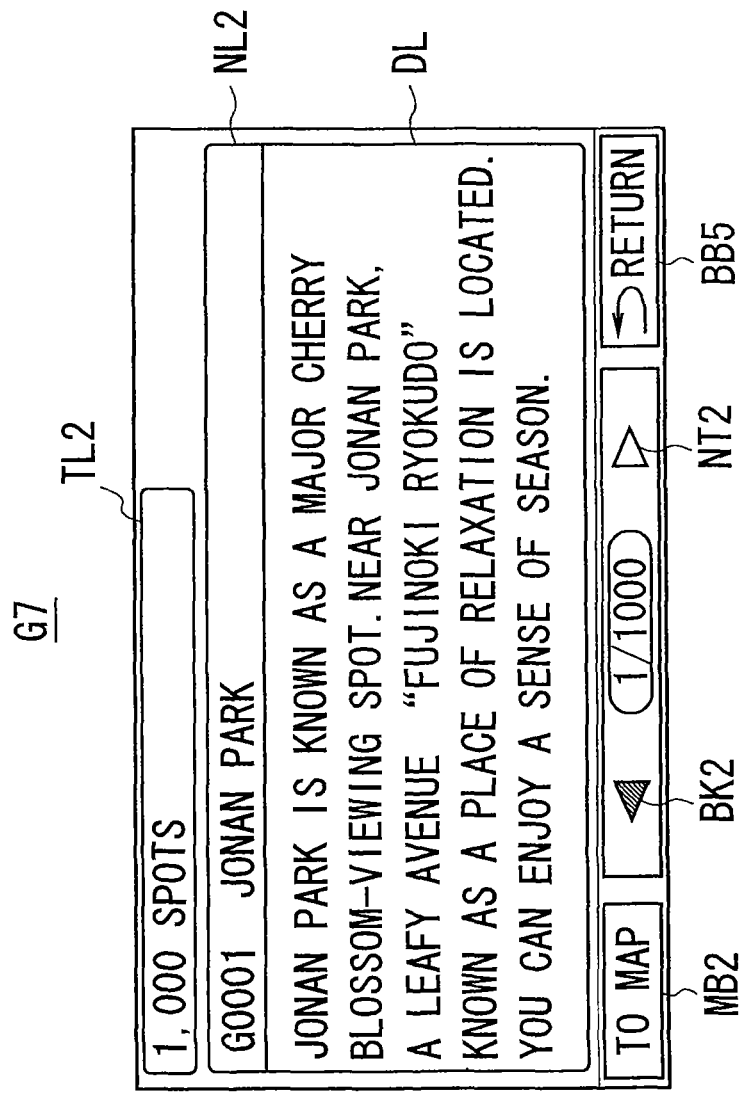
FIG. 9 is a view schematically showing a detailed page screen.

The controller 16 of the PND 1 then displays a detailed page screen G7 corresponding to the detailed page screen data S9 on the display section 2 as shown in FIG. 9. The detailed page screen G7 displays a guide book name display field TL2, a spot item name display field NL2, a detailed content display field DL representing detailed content of the "G0001 Jonan Park", a "to-map" button MB2 for returning to the guide map image G1 (FIG. 3), and a return button BB5.

The controller 16 of the PND 1 allows a user to visually confirm the detailed content display field DL of the detailed page screen G7 in the manner as described above. As a result, the user can grasp the detailed content of the "G0001 Jonan Park" and determine whether to set or not the "G0001 Jonan Park" as his or her destination or stop-off point.

Also in this case, the detailed page screen G7 displays, in the lower center thereof, a next button NT2 with an arrow for displaying a next page and a back button BK2 with an arrow for displaying a previous page. When the back button BK2 is touched by a user, the controller 16 of the PND 1 sets back the content of the display section 2 to the introduction page screen G6 concerning the "G0001 Jonan Park".

In addition, when switching from the introduction page screen G6 to detailed page screen G7 (i.e., turn the page) or when switching from the detailed page screen G7 to introduction page screen G6 (i.e., bring back the page), the controller 16 of the PND 1 can perform the switching operation not only by detecting a user's touch operation with respect to the next buttons NT1, NT2 and back buttons BK1, BK2, but also by understanding a command corresponding to a finger gesture with respect to the touch panel 15 of the display section 2. In this case, the controller 16 of the PND 1 can perform the page switching processing according to the command. The details of this command recognition processing will be described below.

(3) Procedure of Command Recognition Processing

As shown in FIG. 9, the controller 16 of the PND 1 enters the processing from a starting step of a routine RT1 according to a command recognition processing program which is an application program started from a hard disk and proceeds to step SP1. In step SP1, when detecting that a touch operation has been made with respect to the touch panel 15 by a user's finger, the controller 16 proceeds to step SP2.

In step SP2, when detecting a touch release operation, i.e., detecting that the user's finger has been separated from the touch panel 15, the controller 16 of the PND 1 proceeds to step SP3.

In step SP3, the controller 16 of the PND 1 calculates the movement amount of the finger on the display section 2 from the touch point detected in step SP1 to touch release point detected in step SP2 and proceeds to step SP4.

In step SP4, the controller 16 of the PND 1 determines whether the movement amount of the finger calculated in step SP3 is not more than a predetermined threshold (e.g., 5 mm). When an affirmative result has been obtained, which means that there is little movement, the controller 16 of the PND 1 determines that a gesture operation based on a drag operation of the finger has not been performed and proceeds to step SP5.

Figure 11:
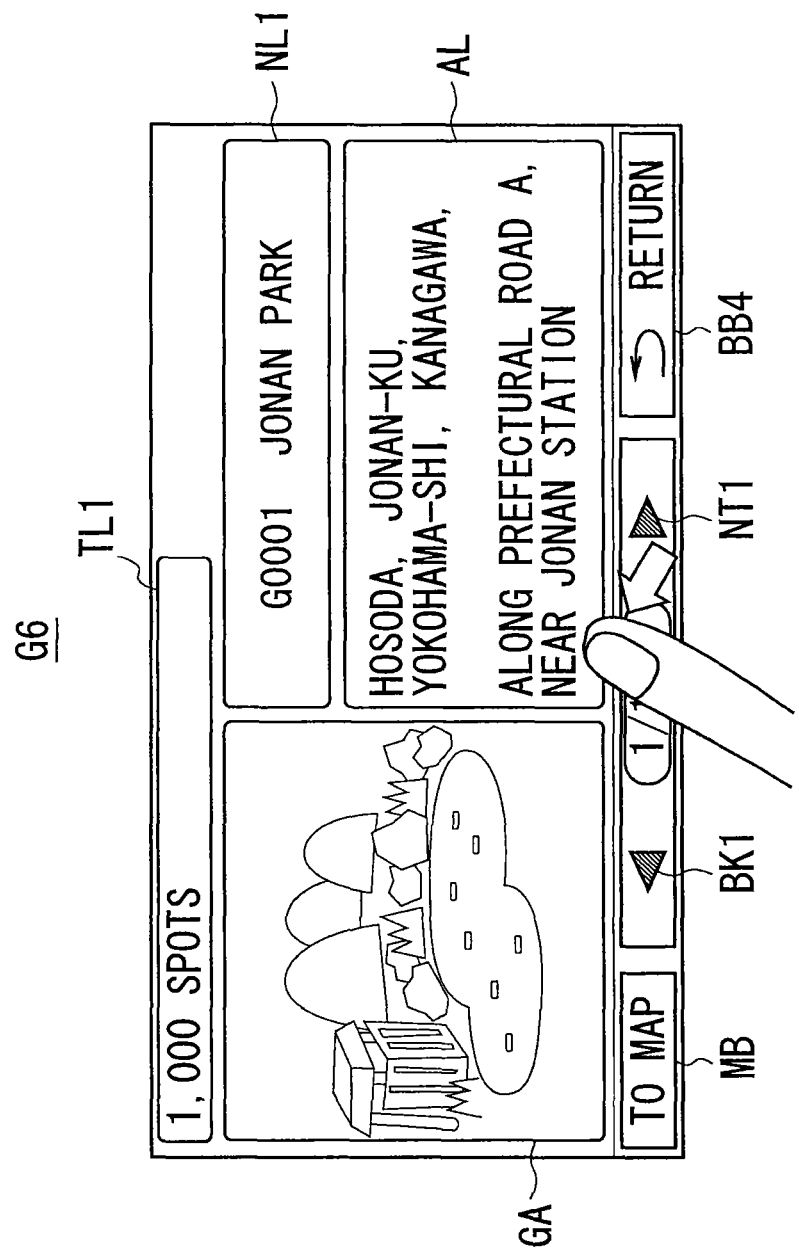
FIG. 11 is a view schematically showing a touch release operation.

Since the finger motion does not mean a gesture operation, the controller 16 of the PND 1 determines, in step SP5, whether any button (e.g., next button NT1) exists at the touch release point as shown in FIG. 11.

When a negative result has been obtained in step SP5, which means that the finger motion means neither a gesture operation nor a button touch operation, the controller 16 of the PND 1 determines that no command has been input and proceeds to step SP8 where the controller 16 of the PND 1 ends this flow without doing anything.

On the other hand, when an affirmative result has been obtained in step SP5, which means that the finger motion means a button touch operation with respect to, e.g., the next button NT1, the controller 16 of the PND 1 proceeds to step SP6.

In step SP6, the controller 16 of the PND 1 recognizes that a command corresponding to the button touch operation with respect to the next button NT1 has been issued and switches the display content from, e.g., the introduction page screen G6 (FIG. 8) to detailed page screen G7 (FIG. 9). Then, the controller 16 of the PND 1 proceeds to step SP8 and ends this flow.

Figure 12:
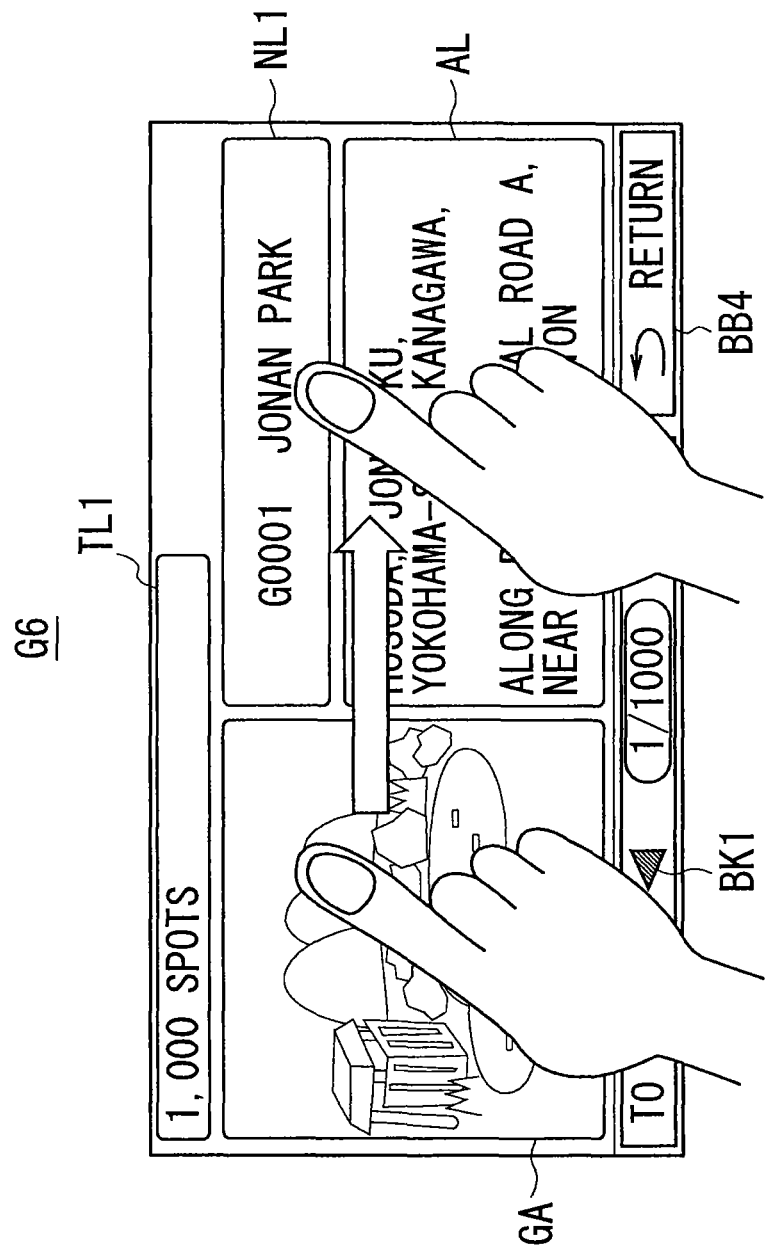
FIG. 12 is a schematic view for explaining a gesture operation.

When a negative result has been obtained in step SP4, i.e., the movement amount of the finger calculated in step SP3 exceeds a predetermined threshold (e.g., 5 mm), which means that a gesture operation based on a drag operation has been performed such that the finger is dragged from the left to right on the display section 2 as shown in FIG. 12, the controller 16 of the PND 1 proceeds to step SP7.

In step SP7, the controller 16 of the PND 1 recognizes, e.g., a page-turning command corresponding to the pattern of a gesture operation and, according to the page-turning command, switches the display content from the introduction page screen G6 (FIG. 8) to detailed page screen G7 (FIG. 9) in such a manner as if the page of a book were turned over. Then, the controller 16 of the PND 1 proceeds to step SP8 and ends this flow.

When recognizing that a gesture operation of a motion pattern in which the finger is dragged from the left to right on the display section 2 has been performed, the controller 16 of the PND 1 performs the abovementioned page-turning operation, while when recognizing that a gesture operation of a motion pattern in which the finger is dragged from the right to left on the display section 2 has been performed, the controller 16 of the PND 1 performs a page turning back operation to set back the display content from the detailed page screen G7 (FIG. 9) to introduction page screen G6 (FIG. 8).

When recognizing that a gesture operation of a motion pattern in which the finger is moved so as to draw a triangle has been performed, the controller 16 of the PND 1 recognizes that the motion means a command to search a driving route from the current position to the home of a user and displays the driving route obtained as a result of the search on the display section 2.

When recognizing that a gesture operation of a motion pattern in which the finger is swirled clockwise has been performed, the controller 16 of the PND 1 enlarges a map currently displayed on the display section 2, while when recognizing that a gesture operation of a motion pattern in which the finger is swirled counterclockwise has been performed, the controller 16 of the PND 1 reduces the map size.

(4) Operation and Effect

With the above configuration, the controller 16 of the PND 1 determines whether a finger motion is a button touch operation or a gesture operation based on a drag operation depending on the movement amount of the finger on the display section 2 from the touch point to touch release point, recognizes a command corresponding to the button touch operation or gesture operation, and performs predetermined processing according to the command.

That is, even if any button displayed on the display section 2 is touched by the finger, the controller 16 of the PND 1 does not determine whether the finger motion is a button touch operation or a gesture operation until the finger is separated from the button.

Therefore, even if a point at which any button exists is accidentally touched by the finger although the user intended to perform a gesture operation, it is possible to prevent the controller 16 of the PND 1 from erroneously determining that the finger motion is a button touch operation.

Further, even if the finger is applied to any button and is moved by an amount not more than a predetermined threshold until it is separated from the display section 2, the controller 16 of the PND 1 does not erroneously determine that the finger motion is a gesture operation but correctly determines that the finger motion is a button touch operation with respect to a button.

According to the above configuration, the controller 16 of the PND 1 correctly determines whether a touch operation is a button touch operation instantaneously made with respect to a button or a gesture operation based on a drag operation to thereby correctly and reliably execute predetermined processing specified by a command corresponding to the button touch operation or gesture operation.

(5) Other Embodiments

In the above embodiment, a value of 5 mm is used as a threshold of the movement amount of the finger from its touch point to touch release point to determine whether the finger motion is a button touch operation or a gesture operation. However, the present invention is not limited to this. For example, the value of the threshold may arbitrarily set depending on various factors such as the size of the display area of the display section 2 or size of the button.

Further, in the above embodiment, the pattern of a gesture operation includes the drag-like motion of the finger from the right to left, drag-like motion of the finger from the left to right, motion of the finger such as one by which a triangle is drawn, and clockwise or counterclockwise swirled motion of the finger. However, the present invention is not limited to this. For example, the pattern of a gesture operation may include a motion of the finger such as one by which "×" or "□" is drawn, a finger tapping motion, and other various types of motions.

Further, in the above embodiment, the controller 16 of the PND 1 determines that the finger motion is a gesture operation based on the movement amount of the finger on the display section 2 from the touch point to touch release point irrespective of whether any button displayed on the display section 2 is touched by the finger. However, the present invention is not limited to this but the controller 16 of the PND 1 may determine that the finger motion is a gesture operation based on the movement amount of the finger on the display section 2 where no button is displayed.

Figure 10:
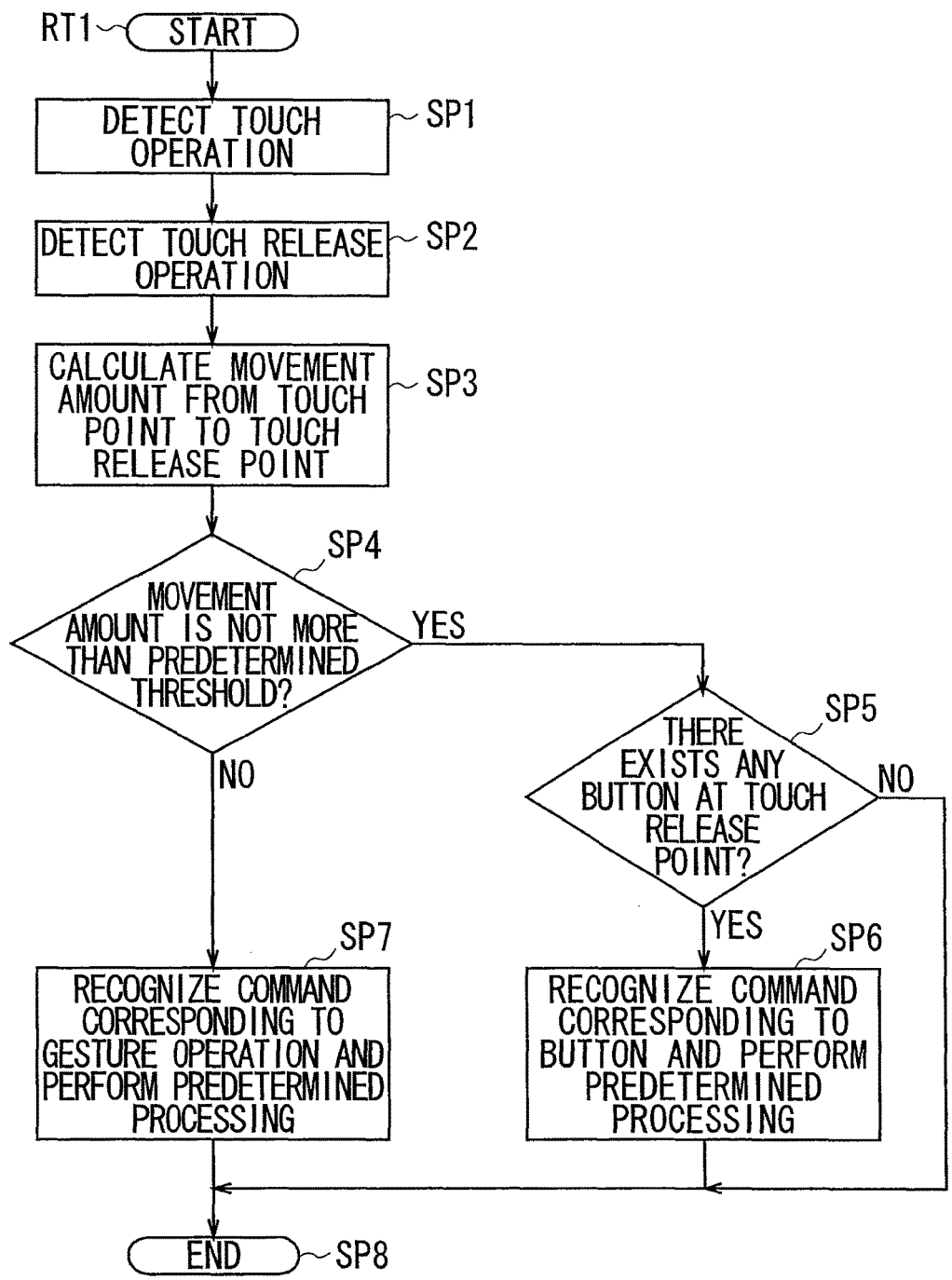
FIG. 10 is a flowchart showing a procedure of command recognition processing.

Further, in the above embodiment, the controller 16 of the PND 1 executes the command recognition processing procedure (FIG. 10) of the routine RT1 according to the command recognition processing program which is an application program stored in a hard disk. However, the present invention is not limited to this but the command recognition processing procedure may be executed according to a command recognition processing program installed from a program storage medium such as a compact disk (CD) or a semiconductor memory, one downloaded from the Internet, or one installed through other various routes.

Further, in the above embodiment, the PND 1 as an information processing device according to the embodiment of the present invention is constituted by the display section 2 serving as a display unit, and controller 16 serving as a movement amount calculation unit, an operation determination unit, and a command recognition unit. Alternatively, however, the information processing device according to the embodiment of the present invention may be constituted by the display unit, movement amount calculation unit, operation determination unit, and command recognition unit including other various circuit configurations.

The information processing device and touch operation detection method can be applied to various electronic apparatuses having a touch panel, such as a dashboard-mounted navigation apparatus other than the PND, a personal computer, a Personal Digital Assistant (PDA), a mobile phone, and a game apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
circuitry configured to:
calculate a movement amount of a touch operation based on a touch point at which the touch operation is performed with respect to a touch panel and a touch release point at which the touch operation is released from the touch panel;
determine whether the touch operation is a single tap operation or a gesture operation based on the calculated movement amount;
generate a command corresponding to the single tap operation or the gesture operation, wherein the command corresponding to the gesture operation is a command to switch a displayed page;
control a display to switch from displaying a second page to displaying a first page in response to a recognition of the gesture operation, wherein the first page includes information identifying a point of interest (POI) and information identifying a geographical location of the POI, and the second page includes detailed information corresponding to the POI that is not included in the first page and a button selectable by a single tap operation to switch from displaying the second page to displaying the first page, wherein the first page includes graphical information not included in the second page, and wherein each of the first page and the second page separately includes a map button selectable to switch to displaying an image corresponding to a map, the image corresponding to the map being distinct from either the information included in the first page or the information included in the second page;
control the display, when the map button on the first page is actuated, to stop displaying the map button and to display the image corresponding to the map by replacing the first page with the image corresponding to the map; and
control the display, when the map button on the second page is actuated, to stop displaying the map button and to display the image corresponding to the map by replacing the second page with the image corresponding to the map.

2. The information processing device according to claim 1, wherein
the circuitry is configured to determine that the touch operation is a gesture operation when the movement amount exceeds a predetermined threshold.

3. The information processing device according to claim 2, wherein
the circuitry is configured to recognize the command associated with a pattern of the gesture operation.

4. The information processing device according to claim 1, wherein
the circuitry is configured to determine that, when the movement amount is not more than a predetermined threshold and a button is displayed at the touch release point at which the touch operation is released, the touch operation is the single tap operation with respect to the button.

5. A touch operation detection method comprising:
detecting a touch point at which a touch operation is performed with respect to a touch panel provided on the front surface of a display;
detecting a touch release point at which the touch operation is released from the touch panel;
calculating a movement amount of the touch operation based on the touch point and the touch release point;
determining whether the touch operation is a single tap operation or a gesture operation based on the calculated movement amount;
generating a command corresponding to the single tap operation or the gesture operation, wherein the command corresponding to the gesture operation is a command to switch a displayed page;
controlling the display to switch from displaying a second page to displaying a first page in response to a recognition of the gesture operation, wherein the first page includes information identifying a point of interest (POI) and information identifying a geographical location of the POI, and the second page includes detailed information corresponding to the POI that is not included in the first page and a button selectable by a single tap operation to switch from displaying the second page to displaying the first page, wherein the first page includes graphical information not included in the second page, and wherein each of the first page and the second page separately includes a map button selectable to switch to displaying an image corresponding to a map, the image corresponding to the map being distinct from either the information included in the first page or the information included in the second page;
controlling the display, when the map button on the first page is actuated, to stop displaying the map button and to display the image corresponding to the map by replacing the first page with the image corresponding to the map; and
controlling the display, when the map button on the second page is actuated, to stop displaying the map button and to display the image corresponding to the map by replacing the second page with the image corresponding to the map.

6. The information processing device of claim 1, wherein the circuitry is configured to control the display to display an icon corresponding to a music application.

7. The information processing device of claim 1, wherein the circuitry is configured to control the display to display an icon corresponding to a video application.

8. The information processing device of claim 1, wherein the second page includes an icon corresponding to a page switching function, and
the circuitry controls the display to switch from displaying the second page to displaying the first page when the icon is selected by a single tap operation.

9. The information processing device of claim 1, wherein the circuitry is further configured to control the display to display the image corresponding to the map upon recognizing a gesture operation.

10. The information processing device of claim 9, wherein
the recognized gesture operation is a horizontal drag-like motion.

11. The information processing device according to claim 1, wherein
the circuitry recognizes a command associated with a pattern of a gesture operation as a command to increase a display scale of the map, and controls the display to increase a display scale of the map based on the recognizing.

12. The information processing device according to claim 11, wherein the pattern associated with the command to increase the display scale of the map is a clockwise pattern.

13. The information processing device according to claim 1, wherein
the circuitry recognizes a command associated with a pattern of a gesture operation as a command to decrease a display scale of the map, and controls the display to decrease a display scale of the map based on the recognizing.

14. The information processing device according to claim 13, wherein
the pattern associated with the command to increase the display scale of the map is a counterclockwise pattern.

15. The information processing device of claim 1, wherein
the circuitry is configured to determine a navigation route from a first location to a second location and control the display to display a result of the determined navigation route.

16. The information processing device of claim 1, wherein
the circuitry is configured to control the display to switch between displaying the first page and the second page in response to the recognition of a gesture operation.

17. A non-transitory computer-readable medium including computer-program instruction, which when executed by an information processing apparatus, cause the information processing apparatus to:
detect a touch point at which a touch operation is performed with respect to a touch panel provided on the front surface of a display;
detect a touch release point at which the touch operation is released from the touch panel;
calculate a movement amount of the touch operation based on the touch point and the touch release point;
determine whether the touch operation is a single tap operation or a gesture operation based on the calculated movement amount;
recognize whether a received command is a command corresponding to the single tap operation or the gesture operation, wherein the command corresponding to the gesture operation is a command to switch a displayed page;
control the display to switch from displaying a second page to displaying a first page in response to a recognition of the gesture operation, wherein the first page includes information identifying a point of interest (POI) and information identifying a geographical location of the POI, and the second page includes detailed information corresponding to the POI that is not included in the first page and a button selectable by a single tap operation to switch from displaying the second page to displaying the first page, wherein the first page includes graphical information not included in the second page, and wherein each of the first page and the second page separately includes a map button selectable to switch to displaying an image corresponding to a map, the image corresponding to the map being distinct from either the information included in the first page or the information included in the second page;
control the display, when the map button on the first page is actuated, to stop displaying the map button and to display the image corresponding to the map by replacing the first page with the image corresponding to the map; and
control the display, when the map button on the second page is actuated, to stop displaying the map button and to display the image corresponding to the map by replacing the second page with the image corresponding to the map.

18. An information processing device comprising:
a display having a touch panel;
a battery configured to provide power;
a global position system (GPS) unit configured to determine a location of the information processing device; and
circuitry configured to:
calculate a movement amount of a touch operation based on a touch point at which the touch operation is performed with respect to the touch panel and a touch release point at which the touch operation is released from the touch panel;
determine whether the touch operation is a single tap operation or a gesture operation based on the calculated movement amount;
recognize whether a received command is a command corresponding to the single tap operation or the gesture operation, wherein the command corresponding to the gesture operation is a horizontal swipe gesture to switch a displayed page;
control the display to switch from displaying a second page to displaying a first page in response to a recognition of the horizontal swipe operation, wherein the first page includes information identifying a point of interest (POI) and information identifying a geographical location of the POI, and the second page includes detailed information corresponding to the POI that is not included in the first page and a button selectable by a single tap operation to switch from displaying the second page to displaying the first page, wherein the first page includes graphical information not included in the second page, and wherein each of the first page and the second page separately includes a map button selectable to switch to displaying an image corresponding to a map, the image corresponding to the map being distinct from either the information included in the first page or the information included in the second page;
control the display, when the map button on the first page is actuated, to stop displaying the map button and to display the image corresponding to the map by replacing the first page with the image corresponding to the map; and
control the display, when the map button on the second page is actuated, to stop displaying the map button and to display the image corresponding to the map by replacing the second page with the image corresponding to the map.

19. The information processing device of claim 18, further comprising:
an interface configured to connect with a cradle and receive power through the cradle.

20. The information processing device according to claim 1, wherein
a display layout of the first page is different from a display layout of the second page.

21. The information processing device according to claim 1, wherein
the detailed information included in the second page is information having a greater level of detail pertaining to the one of the menu items than information provided on the first page.

22. The information processing device according to claim 1, wherein
the second page includes detailed information corresponding to only one of the menu items included in the first page.

23. An information processing device comprising:
a display having a touch panel;
a battery configured to provide power;
a global position system (GPS) unit configured to determine a location of the information processing device; and
circuitry configured to:
control the display to display a first page including information identifying a point of interest (POI), information identifying a geographical location of the POI, and a first icon selectable by a single tap operation to switch from displaying the first page to displaying the second page;
control the display to display a second page including detailed information corresponding to POI that is not included in the first page and a second icon selectable by a single tap operation to switch from displaying the second page to displaying the first page, wherein the first page includes graphical information not included in the second page;
control the display to switch from displaying the first page to displaying the second page in response to a recognition of a single tap operation at a position corresponding to the first icon;
control the display to switch from displaying the second page to displaying the first page in response to in response to a recognition of a horizontal swipe operation or in response to a recognition of a single tap operation at a position corresponding to the second icon, wherein each of the first page and the second page separately includes a map button selectable to switch to displaying an image corresponding to a map, the image corresponding to the map being distinct from either the information included in the first page or the information included in the second page;
control the display, when the map button on the first page is actuated, to stop displaying the map button and to display the image corresponding to the map by replacing the first page with the image corresponding to the map; and
control the display, when the map button on the second page is actuated, to stop displaying the map button and to display the image corresponding to the map by replacing the second page with the image corresponding to the map.

* * * * *